May 8, 1934.  O. WITTEL  1,957,871

SPEED GOVERNOR MECHANISM

Filed Dec. 4, 1930  2 Sheets-Sheet 1

Inventor
Otto Wittel,
By Newton M. ~~~
Donald H. Stewart,
Attorneys

May 8, 1934.  O. WITTEL  1,957,871

SPEED GOVERNOR MECHANISM

Filed Dec. 4, 1930   2 Sheets-Sheet 2

Inventor
Otto Wittel,
By
Attorneys

Patented May 8, 1934

1,957,871

UNITED STATES PATENT OFFICE 1,957,871

SPEED GOVERNOR MECHANISM

Otto Wittel, Rochester, N. Y., assignor to Eastman Kodak Company, Rochester, N. Y., a corporation of New York Application December 4, 1930, Serial No. 499,940

5 Claims. (Cl. 188—187)

This invention relates to photography and more especially to motion picture cameras. One object of the invention is to provide a simple type of control for the film-moving mechanism. Another object of my invention is to provide a pulldown mechanism for film which may be directly connected to a means for controlling the speed of the pulldown and to a starting and stopping lever. Another object of my invention is to provide a simple type of governor. Still another object is to provide a speed governing mechanism which will not strain or injure the pulldown mechanism when the latter is brought to a sudden stop and other objects will appear from the following specification, the novel features being particularly pointed out in the claims at the end thereof.

Coming now to the drawings wherein like reference characters denote like parts throughout.

My invention is particularly directed to the provision of a toothed film engaging member for intermittently operating the film, this member being connected to and driven by a rotatable shaft. This shaft preferably supports a stop for controlling the movement of the pulldown claw and also preferably supports the governor by which the speed is controlled.

Figure 1:
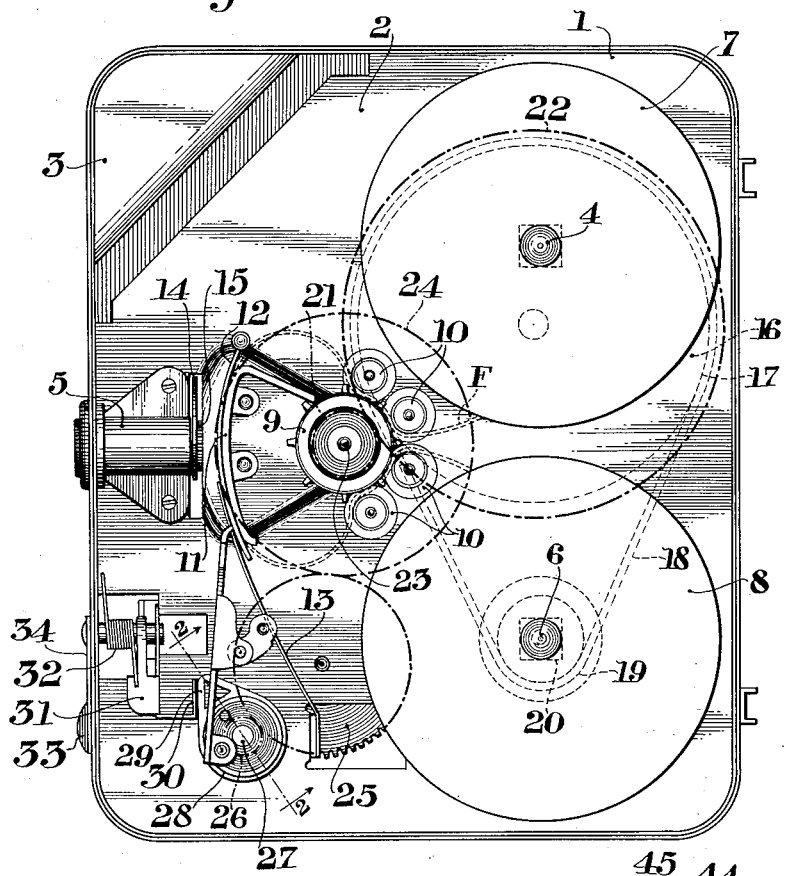
Fig. 1 is a side elevation of a camera having parts constructed in accordance with one embodiment of my invention, a side elevation of the camera with the cover removed being shown in this figure.

As indicated in Fig. 1 a preferred embodiment of my invention may consist of a camera body 1 in which there is supported a mechanism plate 2. A finder 3 may be built in one corner of the camera casing 1 and an objective is preferably mounted in a lens barrel 5.

There are two film supporting hubs 4 and 6. Hub 4 may support a supply reel 7 of film and hub 6 may support a take-up reel 8. The film F is shown in broken lines passing from the supply to the take-up reel through a path defined by a supply sprocket 9, a series of guide rolls 10 and a gate consisting of a fixed plate 11 and a movable gate member 12, the film passing between these two plates. A spring 13 bearing on the gate member 12 normally holds the gate closed.

Behind the lens barrel 5 there is the usual shutter 14 which may be driven through gear 15 by a series of gears, not shown, from a motor 16.

This motor is provided with a pulley 17 about which a belt 18 passes, this belt driving a pulley 19 and through this pulley the squared end 20 of the hub 6 so that the take-up reel 8 may be driven by power.

The film is moved by means of the sprocket 9 which is connected to the motor by means of a pinion 21 meshing with a gear 22 on the motor 16 so that as the motor turns the sprocket 9 will turn. A shaft 23 supports both the gear 21 and the sprocket 9. In addition there is a gear 24 on this shaft, this gear meshing with a gear 25, gear 25 meshing with a pinion 26 on a rotatable shaft 27.

Shaft 27 carries affixed thereto a plate 28 with an offset stop 29 and this stop may be engaged by lug 30 carried on an arm 31 normally pressed by spring 32 into the full line position shown in which it engages and prevents the rotation of member 28.

A handle 33 is provided with an arm 34, this handle serving as a release to forcibly move the stop 30 out of the path of the stop 29 permitting the free rotation of the pulldown claw under the impulse of the spring motor through the gearing above described.

The means for controlling the movement of the pulldown is, therefore, mounted directly on shaft 27.

There is also a means for controlling the speed of rotation of shaft 27 mounted directly on the shaft. A governor designated broadly as 35 may consist of a sleeve member 36 which is attached to a shaft 27 by means of a set screw 37.

Figure 6:
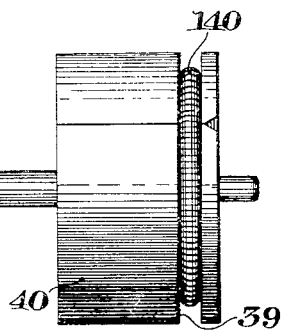
Fig. 6 is a side elevation of the governor elements shown in Fig. 5.

The governor includes a plurality of, preferably three, weights 38, each of the weights having a groove 39 which extends about the curved faces 40 in such a manner that when the weights are assembled as shown in Fig. 6, for instance, an annular groove extends entirely around the weighted members. In this annular groove 39 I place a resilient member preferably an endless coiled spring 140.

Figure 7:
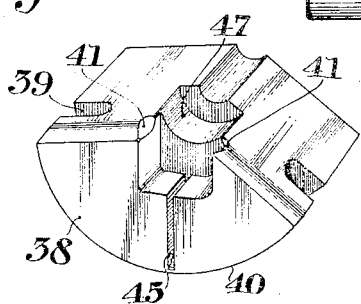
Fig. 7 is a perspective view of one of the governor elements disassembled.

As indicated in Fig. 7 each of the weights is provided with a comparatively small bearing surface 41 which is adapted to engage the annular flange 42 of the sleeve 36. Because of this small flange engaging surface 41, the weights may rotate upon the flange 42.

To prevent rotation in one direction, however, I provide a friction clutch in the form of a coiled spring 43 having one end 44 anchored in a groove 45 formed in the weight and the other end embracing in a series of convolutions the outside surface 46 of the sleeve 36. These spring convolutions may lie within the cutout portion 47 of the weights provided for that purpose. When the shaft 27 turns in one direction, the spring convolutions 43 tend to tighten and thus the weights 38 turn with shaft 27. When, however, the shaft 27 is brought to a sudden stop as by member 29 striking the stop 30, the weights may continue to rotate in the same direction as the convolutions 43 of the clutch will become loosened. This movement prevents the weight of the governor from straining or injuring the rest of the pulldown mechanism.

When, however, the shaft 27 is again turned by the motor by moving the trigger 33 to release member 30 the spring 43 is placed under tension and acts as a clutch which connects the weights with the sleeve shaft 36 so that the governor may again control the speed of operation.

Figure 2:
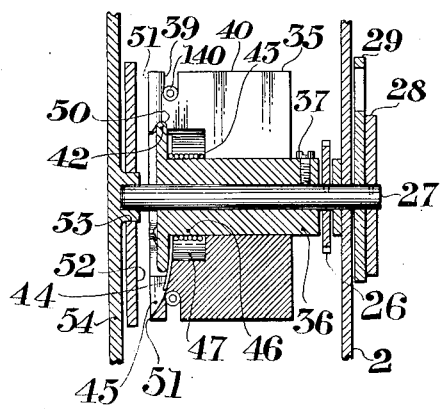
Fig. 2 is a sectional line 2—2 of Fig. 1.
Figure 3:
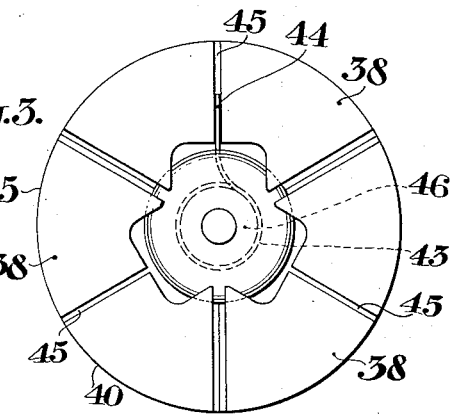
Fig. 3 is an end view of the governor shown in Fig. 2 but made on a somewhat enlarged scale.
Figure 5:
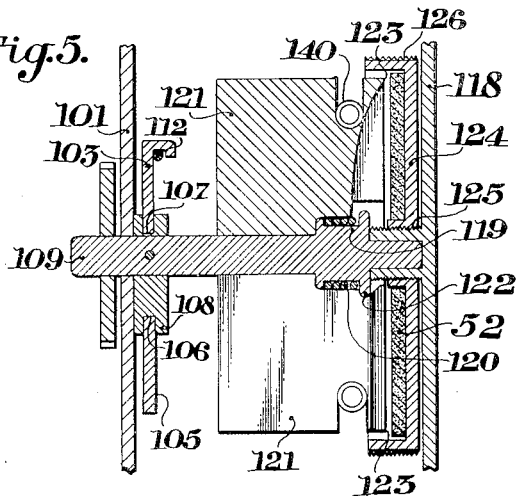
Fig. 5 is a sectional line 5—5 of Fig. 4 showing the pulldown and associated parts.

From Fig. 2 it will be seen that when the shaft 27 is turned at a sufficient speed to throw the weights outwardly upon their fulcrum 50 which is the above described bearing surface 41 in contact with the annular flange 42. The resilient member 140 attempts to restrain this movement. If the speed of the shaft 27 is sufficient, these weights may move out against the pressure of spring 140 until the edges 51 are brought into contact with the friction material 52. This may consist of a fiber or leather member and it may be mounted on a hub 53 carried by the camera wall 54. If desired it can be adjustably mounted as indicated in Fig. 5.

Figure 4:
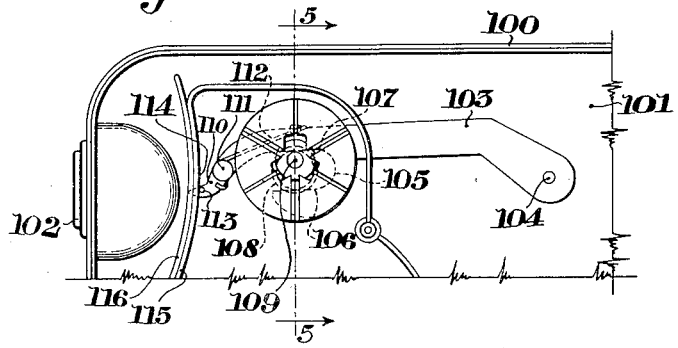
Fig. 4 is a fragmentary elevation of a second embodiment of my invention, the pulldown mechanism being of a different type from that shown in Fig. 1.

In a second embodiment of my invention as shown in Fig. 4. The camera 100 may be provided with a mechanism plate 101, an objective mount 102 and a pulldown claw 103. This claw may be pivoted at 104 to the mechanism plate and may be provided with a hook 105, the sides 106 and 107 of which engage a cam 108. Cam 108 is mounted on a shaft 109 which is a power shaft connected to a spring motor through any desired gearing.

A pulldown claw 110 is pivoted at 111 to arm 103 and a spring 112 keeps a pin 113 resting against a guide 114 which is conveniently the rear surface of a relatively fixed gate member 115, a relatively movable gate member 116 being mounted in front of the first mentioned member. Film to be projected is threaded between the gate members in the usual fashion so that the claw 113 when oscillated by the cam 106 may advance the film intermittently.

As in the first embodiment of my invention the rotatable shaft which operates the pulldown mechanism likewise supports the governor for controlling the speed of operation of the pulldown.

Referring particularly to Fig. 5 the shaft 109 is shown as having a bearing in plates 101 and 118, the shaft being enlarged at 119 to provide a bearing surface for an over-running clutch 120 which is preferably made of coiled spring wire as fully described in connection with the first embodiment of my invention.

The present embodiment differs from the first embodiment, however, in that the weights 121 are mounted to turn upon an annular flange 122, this flange being formed on the shaft 109. In other words, in this form the sleeve shaft 36 used in the first described embodiment is not necessary.

As in the first embodiment the weights 121 may be held together by a resilient member preferably an endless spring 140 and when the weights by centrifugal force move apart, the faces 123 come in contact with frictional material 52 which is here shown as being carried by disc 124 having threaded connection at 125 with its support and having a knurling 126 by which the frictional material may be adjusted to and from the weights 121 to accurately vary the speed thereof.

There are several reasons for mounting the governor on the shaft which operates the pulldown mechanism. In the first place this shaft is one of the most rapidly operated shafts in the camera and consequently is the best suited for accurately governing the speed of the entire machine. By providing a comparatively heavy governor smoothness of operation is insured since the weight of the governor tends to smooth out irregularities in the operation of the pulldown claw. The pulldown claw, of course, works intermittently and consequently there is normally an uneven load on the shaft which drives this device.

It is also obviously useful to stop the pulldown mechanism as suddenly as possible since when this is done it is not necessary to over-expose the last few frames as when the pulldown mechanism is being slowed up. By providing a one-way or over-running clutch of the type above described it is possibe to have a comparatively heavy governor and prevent this heavy part from straining the camera mechanism by permitting it to continue to turn after the pulldown has stopped.

Reference may be had to my Patent 1,676,594, issued July 10, 1928 for a more detailed description of the releasing lever 33 and its associated parts as the structure is the same in both cases.

Having thus described my invention, what I claim as new and desire to secure by Letters Patent is:

1. In a governor, the combination with a shaft adapted to be rotated, a flange on said shaft, a plurality of weight members rotatably mounted on said shaft in sliding engagement with said flange and provided with an end recess, and a resilient means encircling said weights and opposing movement thereof due to rotation of said shaft, of a coil spring encircling said shaft within said recess and having one end anchored in one of said weight members.

2. In a centrifugal governor, the combination with a shaft adapted to be rotated, an annular flange on said shaft, and a plurality of weight members slidably engaging said flange and adapted to swing about said flange in a plane containing the axis of said shaft, of a one-way clutch means between said shaft and at least one of said weight members whereby the shaft drives the weight members but the weight members do not drive the shaft.

3. In a centrifugal governor, the combination with a shaft adapted to be rotated, an annular flange on said shaft, and a plurality of weight members slidably engaging said flange and adapted to swing about said flange in a plane containing the axis of said shaft, of a coil spring encircling said shaft and having one end anchored in at least one of said weight members whereby the shaft drives the weight members but the weight members will rotate in one direction without turning the shaft.

4. In a centrifugal governor, the combination with a shaft adapted to be rotated, an annular flange on said shaft, and a plurality of weight members slidably engaging said flange and adapted to swing about said flange in a plane containing the axis of said shaft, of a coil spring encircling said shaft, having one end anchored to at least one of said weight members and being adapted frictionally to engage said shaft when the shaft is rotated in one direction only.

5. In a centrifugal governor, the combination with a shaft adapted to be rotated, an annular flange on said shaft, a plurality of weight members slidably engaging said flange and adapted to rock about said flange in a plane containing the axis of said shaft, and a resilient member encircling said weight members, of an adjustable friction surface normally in spaced relation to said weight members but adapted frictionally to engage said weight members upon their rocking about said flange through a predetermined angle.

OTTO WITTEL.